No. 726,465. PATENTED APR. 28, 1903.
S. A ROSS.
NET LIFTING MACHINE.
APPLICATION FILED JULY 26, 1902.
NO MODEL.
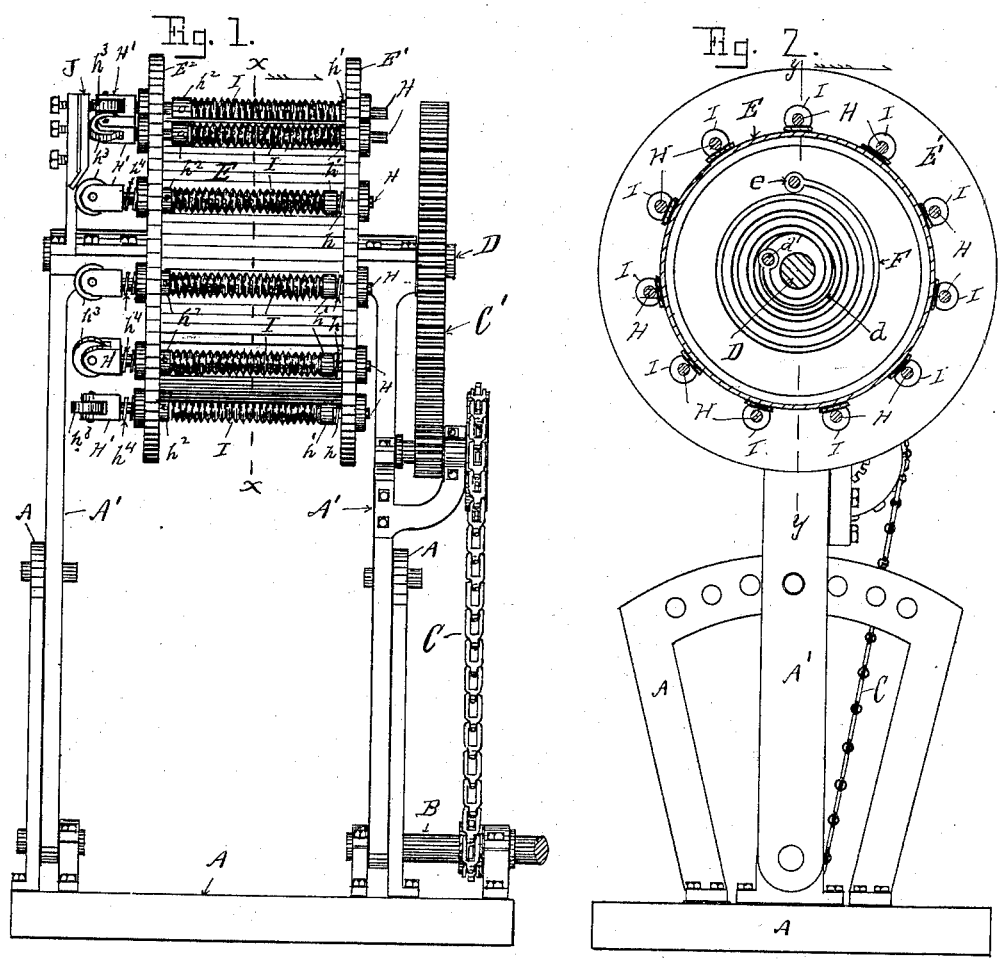
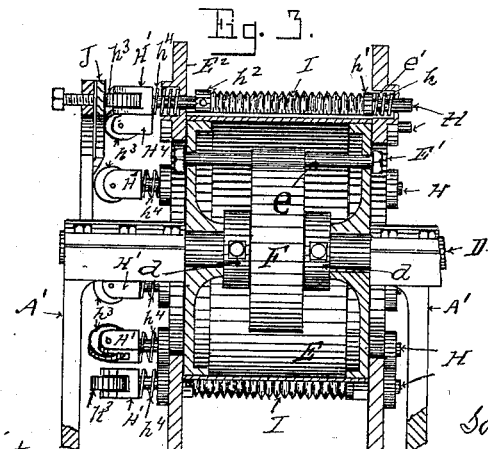
Witnesses.
Charles A. Mertens
Florence Stockert
Inventor.
Samuel A. Ross
By J. C. & H. M. Sturgeon
Atty's.

UNITED STATES PATENT OFFICE.

SAMUEL A. ROSS, OF ERIE, PENNSYLVANIA.

NET-LIFTING MACHINE.

SPECIFICATION forming part of Letters Patent No. 726,465, dated April 28, 1903.

Application filed July 26, 1902. Serial No. 117,214. (No model.)

*To all whom it may concern:*

Be it known that I, SAMUEL A. ROSS, a citizen of the United States, residing at Erie, in the county of Erie and State of Pennsylvania, have invented certain new and useful Improvements in Net-Lifting Machines; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

My invention relates to improvements in net-lifting machines, and has for its object the production of a machine which will lift nets without tearing them in cases where sudden and unusual strain is brought upon the net during the operation of lifting it. I accomplish this result by connecting the rotary lifting-drum of the machine with the drum-shaft upon which it is mounted by means of spring mechanism in such manner that when a sudden and unusual strain is brought upon the drum it will stop and the driving power be exerted upon the spring connection until the net is relieved or the driving mechanism stopped.

Another feature of my improvement relates to the spring mechanism for operating the net-gripping jaws.

These and other features of my invention are hereinafter fully set forth and described, and illustrated in the accompanying drawings, in which—

Figure 1 is a front view, in elevation, of a net-lifting machine embodying my invention. Fig. 2 is a vertical section of the same on the line $x\ x$ in Fig. 1. Fig. 3 is a vertical section of the upper part of the same through the drum on the line $y\ y$ in Fig. 2.

In the drawings illustrating my invention, the frame A A', the driving-shaft B, the gearing C C', and the driving-shaft D are of the usual construction and mounted in the frame A A' in the usual manner. Upon the drum-shaft D, I mount a drum E, so that it will rotate freely upon the shaft D, and to the central part of the shaft D, I secure the inner end of a strong spiral spring F, preferably by means of collars $d\ d$, secured to the shaft, and a pin $d'$ between said collars, while the outer end of the spring F is preferably secured to a rod $e$ between the ends E' E² of the drum E, as clearly shown in Figs. 2 and 3. The peripheries of the ends E' E² of the drum E extend some distance beyond the shell of said drum, as shown in all of the figures. Around the periphery of the drum E at intervals there are sliding bars H, which extend through the heads E' E², and in the head E' there are recesses $e'$, in which are placed spiral springs $h$, operating on the loose sliding collars $h'$ on the bars H. On the bars H near the head E² there are fixed collars $h^2$, and between the fixed collars $h^2$ and the loose sliding collars $h'$ there are a series of net-grippers I, which slide loosely upon the bar H between said collars $h'$ and $h^2$. On the end of the bar H, passing through the head E², there is a head H', in which there is mounted a friction-roller $h^3$, adapted to contact with a cam-surface J during certain portions of the rotation of the drum E, as shown in Figs. 1 and 3, and move the bar H longitudinally, and between the head H' and the cylinder-head E² each bar is provided with a spiral spring $h^4$, so that when the rollers $h^3$ contact with the cam J the bar H is moved longitudinally, so as to compress the springs $h^4$ and $h$, and operates through the loose and fixed collars $h'$ and $h^2$ to compress the net-grippers I together, so as to grip the strands of a net so long as the rollers $h^3$ are in contact with the cam-surface J, and when the rollers $h^3$ pass off of the cam-surface J the springs $h^4$ operate to move the bars H back to their normal positions and relieve the gripping-jaws I from the pressure of the springs $h$, which allows the strands of the net to be withdrawn therefrom.

Having thus described my invention, so as to enable others to utilize the same, what I claim as new, and desire to secure by Letters Patent of the United States, is—

1. The combination in a net-lifting machine of a drum-shaft, a drum thereon, a spring connecting the drum with the shaft, longitudinally-sliding bars on the periphery of said drum, a cam for moving said bars in one direction, and springs for moving them in the other direction, fixed and loose collars on said bars, grippers on said bars between said collars, and springs acting on said loose collars, substantially as and for the purpose set forth.

2. The combination in a net-lifting machine, of a rotating drum, and a gripper mechanism thereon comprising substantially a sliding bar, a spring adapted to move said bar in one direction, cam mechanism for moving said bar in the other direction, a fixed collar and a loose collar on said bar, grippers between said collars, and a spring acting on said loose collar, substantially as and for the purpose set forth.

3. The combination in a net-lifting machine of a frame, a rotating drum mounted thereon, longitudinally-sliding bars on the periphery of the drum, a fixed collar on one end and a loose sliding collar on the other end of said bar, grippers between said collars, a spring operating against said loose collar when the bar is moved longitudinally in one direction, and a cam-surface on the frame of the machine with which the ends of the bars contact during a portion of the drum's rotation and moves said bars longitudinally so as to compress said spring during the contact of the bars with said cam-surface, substantially as and for the purpose set forth.

In testimony whereof I affix my signature in presence of two witnesses.

SAMUEL A. ROSS.

Witnesses:
F. J. BASSETT,
CHARLES A. MINTURS.